March 25, 1958 A. N. SPITZ ET AL 2,827,829
MOVABLE STAR IMAGE PROJECTOR FOR PLANETARIUMS
Filed April 19, 1955 3 Sheets-Sheet 1

INVENTORS
ARMAND N. SPITZ &
GILMORE L. STITELY
BY
ATTORNEYS

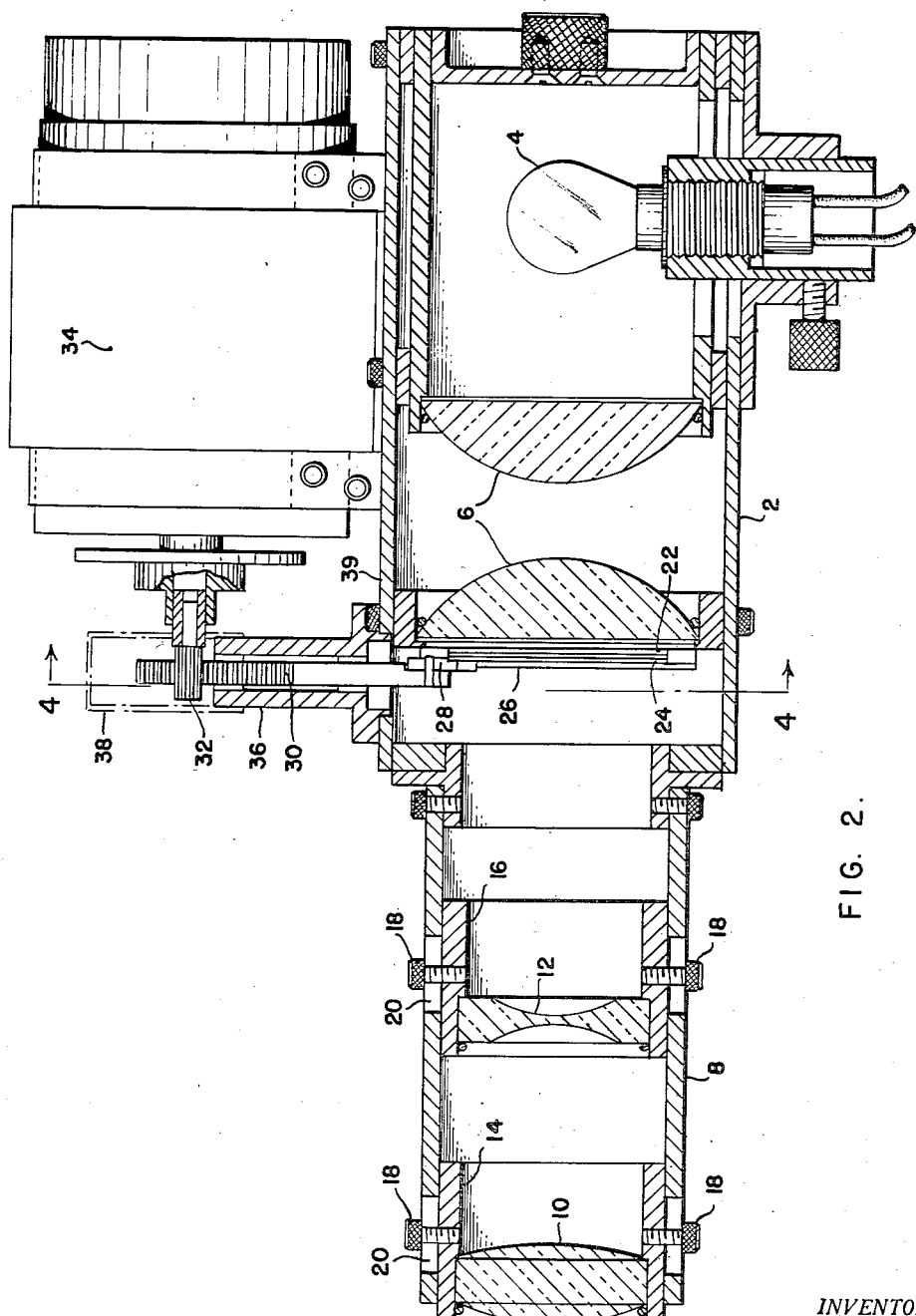

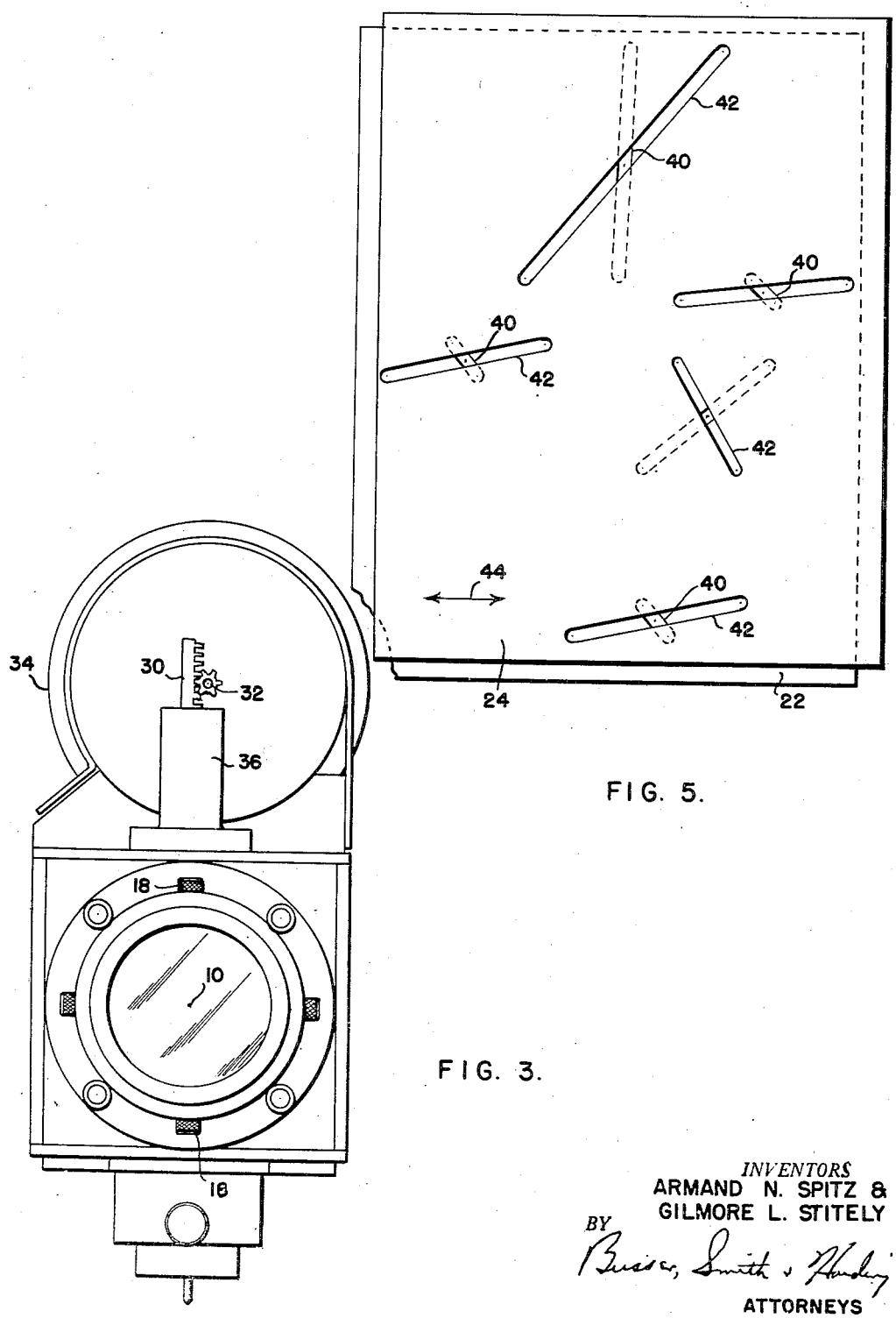

United States Patent Office 2,827,829
Patented Mar. 25, 1958

2,827,829

MOVABLE STAR IMAGE PROJECTOR FOR PLANETARIUMS

Armand N. Spitz, Philadelphia, Pa., and Gilmore L. Stitely, Elkton, Md.

Application April 19, 1955, Serial No. 502,334

2 Claims. (Cl. 88—24)

This invention relates to a projector particularly designed for planetarium use for the projection of limited extents of motion of heavenly bodies.

One object of the present invention is to provide a projector whimh may provide images of a group of stars and is adapted to show their proper motions over an extended period of time. For example, the projector is designed to show the changes in disposition of stars of particular constellations to illustrate how the constellations may have changed in configuration over long periods of the order, for example, of ten thousand to several hundred thousand years. When so used, the projector may supplement a conventional star projector, providing star images in substitution for the usual images of fixed relationship which the star projector would normally supply. For example, in the type of projector shown in the application Armand N. Spitz, Serial Number 483,547, filed January 24, 1955, the stars of a constellation are normally projected in a fixed relationship through the use of perforations in hemispherical globular members. If it is desired to show not only present configuration of the stars of a constellation but also to show how that constellation may have appeared many years in the past or will appear many years in the future, the apparatus in accordance with the present invention may be secured to the planetarium projector to take care of the ordinary motions of the constellation as a whole, the normally projecting openings being covered by adhesive tape, or the like. Then, in some part of the demonstration, the special projector constituting the present invention may be operated to show the motions of the stars of the constellation.

A further object of the invention is to provide a projector of even more general use. For example, it may be used to show the path of movement of a comet, or even relative movements between planets, or the like. Furthermore, it may be used to show other variable points in the heavens which may have only mathematical significance.

The foregoing and other objects of the invention particularly relating to details of construction and operation will become apparent from the following description read in conjunction with the accompanying drawings, in which:

Figure 2 is a section taken axially through the projector;

Figure 3 is an elevation looking at the left-hand end of Figure 2;

Figure 5 is a diagrammatic view showing, in particular, the arrangement of relatively movable slotted plates providing moving images for the purposes indicated above.

Figure 1:
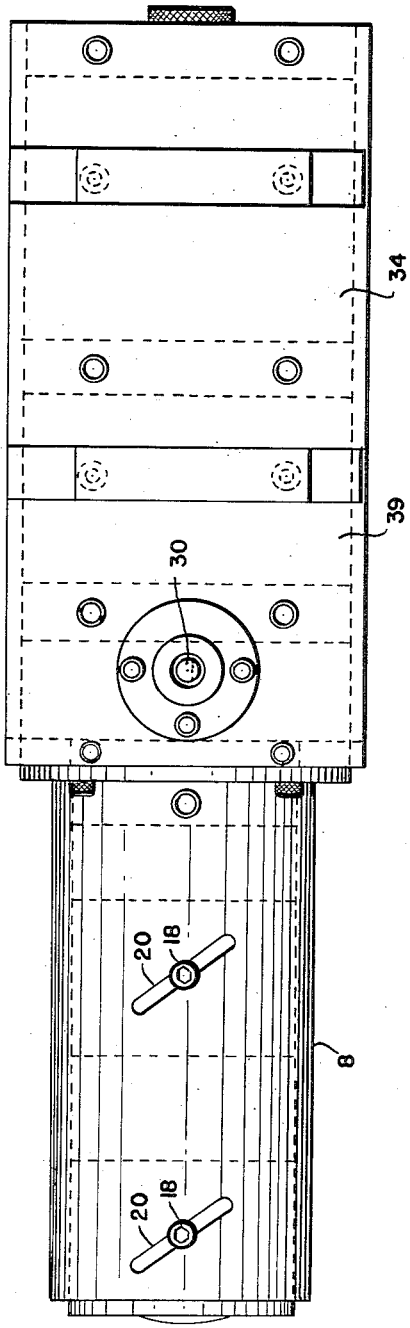
Figure 1 is a plan view of the projector with the motor and driving connections therefrom removed.
Figure 4:
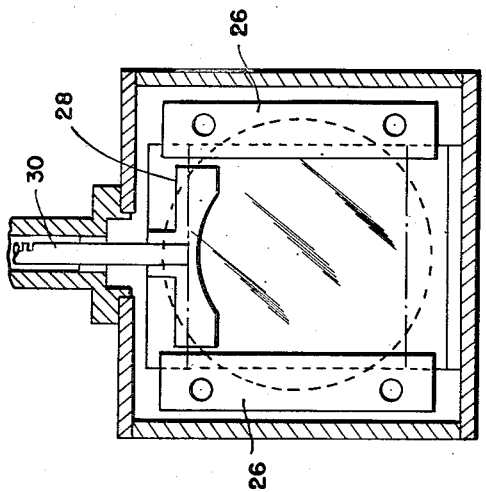
Figure 4 is a transverse section taken on the plane indicated at 4—4 in Figure 2.

The projector comprises a housing 2 which may be mounted by suitable clamping means (not shown) on a planetarium projector such as described in the aforementioned Spitz application. Within the housing there is located a projecting lamp 4 together with condenser lenses 6, while a tubular extension 8 of the housing supports projecting lenses 10 and 12 carried by sleeves 14 and 16 arranged to be axially adjusted with rotation by the guidance of the shanks of screws 18 within helically arranged slots 20, provision being made for clamping by tightening the screws 18 on the shoulders of the slots.

Adjacent to the front condenser lens 6 there is removably located a fixed plate 22 in front of which there is movable a second plate 24 guided in guideways provided by members 26 and secured to a rack 30 through a holding member 28, the rack being driven by a pinion 32 from, preferably, a selsyn type receiver 34 which may be remotely positioned by electrical connection in conventional fashion to a selysyn transmitter subject to manual control. The rack 30 is housed within a tube 36 which may be capped at 38 to prevent the entry of dust into the mechanism. The housing may be provided with a top cover 39 removable to permit replacement of the plates 22 and 24.

The plates 22 and 24 are respectively provided with slits 40 and 42 which overlap as indicated in Figure 5 in which the relative motion of the plates is indicated by the double arrow 44. If the slits are properly narrow, they present to the projecting lens system small rhombuses illuminated by the condenser system and projectable on the planetarium dome. With the suitable low intensity illumination to correspond with that of the usually associated stars, the images even if sharply focused and, therefore, strictly speaking, rhombuses, will appear to the eye of an observer as merely indefinite spots of light practically having the appearance of points. The effect, however, may be enhanced by slight deviation from sharp focus. Relative intensities of the images may be provided merely by forming the slits 40 and/or 42 of different widths. In projection such as here involved, the size of the projected image is translated by the eye into an impression of intensity.

By suitable disposition of the slits, it will be evident that relative movement of the plates 22 and 24 will provide "pinhole" sources of varying configuration, and the shapes and arrangements of the slits may be freely varied to give close approximations to proper rendition of the relative movements involved over long periods in the case of stars or over relatively short periods in the case of comets, or the like. In Figure 5, the slits are shown straight. For projection of constellations, such straight lines are ordinarily proper and completely satisfactory since curvature of the star paths would be quite unnoticeable. Where curvatures are involved, however, as may be the case in the projection of a comet, the slits may obviously be properly curved.

While the slits may be formed as actual openings in metallic plates, it will be evident that they may be provided merely by scratching away opaque coatings on glass or plastic carriers, and where slits are referred to herein it will be understood that the reference is intended to be to narrow light-transmitting areas in otherwise opaque backgrounds.

It will be evident from the above that numerous variations may be made in details of construction and operation without departing from the scope of the invention as defined in the following claims.

What is claimed is:

1. Apparatus for the projection of moving light images adapted to simulate star images comprising projecting means for projecting images of apertures in a slide plate assembly upon a viewing screen, said slide plate assembly comprising a pair of substantially opaque plate members positioned in overlapping relation to each other and provided with at least one pair of overlapping slits angularly positioned on said plate members, means for guiding one of said plate members for movement in a direction in its plane and relative to the other of the plate members, means for projecting light through the opening provided by the intersection of said paired overlapping slits during relative movement of said plate members.

2. Apparatus in accordance with claim 1 in which said projecting means comprises an illuminating and condensing system at one side of said plate assembly and a projecting system at the other side of said plate assembly.

References Cited in the file of this patent

UNITED STATES PATENTS

| | | |
|---|---|---|
| 1,052,835 | Littman | Feb. 11, 1913 |
| 1,066,765 | Spiegel | July 8, 1913 |
| 1,113,610 | Gilmore | Oct. 13, 1914 |
| 1,119,597 | Henry | Dec. 1, 1914 |
| 1,224,392 | Loftus | May 1, 1917 |
| 1,608,301 | Charton | Nov. 23, 1926 |
| 1,724,566 | Davidson | Aug. 13, 1929 |
| 2,108,844 | Brady | Feb. 22, 1938 |
| 2,114,417 | Ellinson | Apr. 19, 1938 |
| 2,168,799 | Korkosz et al. | Aug. 8, 1939 |
| 2,201,376 | Prins | May 21, 1940 |
| 2,393,310 | Crane | Jan. 22, 1946 |
| 2,483,216 | Marshall | Sept. 27, 1949 |
| 2,519,251 | Johanson | Aug. 15, 1950 |
| 2,632,359 | Spitz | Mar. 24, 1953 |